Sept. 16, 1941.  J. F. LEVENTHAL  2,255,892
MOTION PICTURE APPARATUS
Filed Oct. 2, 1940
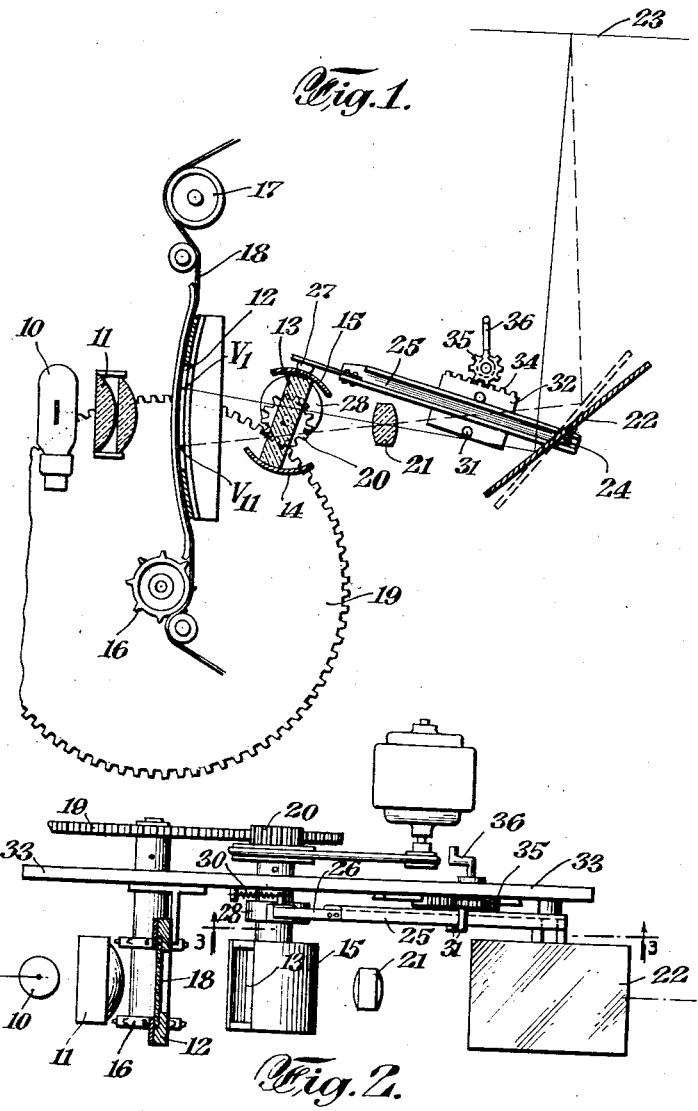
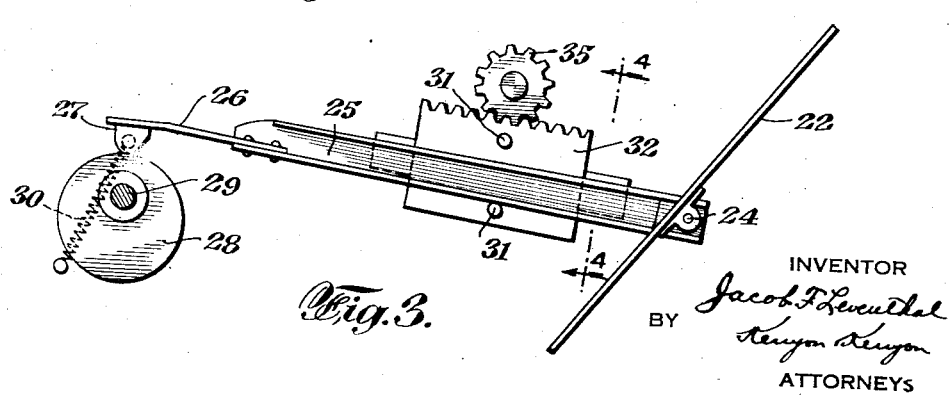
INVENTOR
Jacob F. Leventhal
BY Kenyon & Kenyon
ATTORNEYS Patented Sept. 16, 1941

2,255,892

UNITED STATES PATENT OFFICE 2,255,892

MOTION PICTURE APPARATUS

Jacob F. Leventhal, New York, N. Y., assignor to Leventhal Patents, Inc., New York, N. Y., a corporation of Delaware Application October 2, 1940, Serial No. 359,332

6 Claims. (Cl. 88—16.8)

This invention relates to motion picture apparatus and more especially to projectors in which the film moves uninterruptedly across the optical axis and the screen images are rendered stationary by optical compensation.

In some such systems, the optical compensator consists of a single plane-parallel plate of glass which is rotated between the film and lens in timed relation with the linear movement of the film. The plate may have such thickness and refractive index that a complete rotation of the plate during a picture cycle will produce of a single picture frame crossing the axis, two successive stationary spaced virtual images separated in time from each other by periods of undesired effect which must be shuttered off. A plurality of thicker plane-parallel plates may be used to the same effect as shown in Leventhal Patents Nos. 1,974,573 and 2,085,594.

Since two spaced virtual images are produced which are re-imaged at a screen plane by a lens, means must be provided to act with the lens for bringing the spaced real images into register at the screen. Such means are shown in Leventhal Patent No. 2,085,594 and involve reflectors interceptive of the light beam from the lens, each reflector when active being placed at such angle as to direct the axis of the picture to its proper point of registration at the screen plane. The arrangement shown in such patent has two different kinds of disadvantage. First, if the two mirrors are stationary, each can transmit only half the available light from the lens since both are in the beam and one must be shuttered off while the other is effective. Second, if one mirror is made rotatable so as to intercept the whole beam, a difficult mechanical problem presents itself with respect to the rotation of the mirror. While it is not impossible to insure that the reflector will revolve in its true plane without deviation, it is nearly so from a practical standpoint.

An object of the present invention is a projector of the character above described equipped with reflecting means arranged to transmit all the useful light to the screen and to be stationary during the periods of light transmission through the lens.

Other objects, novel features and advantages of this invention will become apparent from the following specification and accompanying drawing, wherein:

Fig. 1 is a diagrammatic section substantially on the line 1—1 of Fig. 2;

Fig. 2 is a plan view with parts in section;

Fig. 3 is an enlarged section substantially on the line 3—3 of Fig. 2, and

Fig. 4 is a section on the line 4—4 of Fig. 1.

In the drawing, 10 is a light source and 11 is a condenser lens associated therewith to direct light from the source through the film gate 12. An optical compensator 13 consisting of a single glass plate is rotatably mounted just beyond the film gate and is provided with arcuate obturators 14 and 15 which intercept the light passing through the film gate over predetermined portions of the rotation of the compensator. A picture sprocket 16 co-operates with a retaining roller 17 to draw a film 18 past the gate 12. A gear 19 is fixed to the sprocket wheel 16 and a gear 20 meshing with the gear 19 is fixed to the compensator 13. The gears are in the ratio of 8 to 1 and a single picture frame crosses the optical axis for each complete revolution of the compensator 13, thereby forming the two successive spaced virtual images $V_I$ and $V_{II}$ in the manner fully explained in Leventhal Patent No. 2,067,771 with the obturators intercepting the light beam twice for each complete revolution of the compensator.

An objective lens 21 is provided for reproducing real images of such virtual images and a mirror 22 is provided for effecting registry of such real images at a screen plane 23. The mirror 22 is oscillatable between two positions in one of which it receives light for reproducing a real image of one of the virtual images and in the other of which it receives light for reproducing a real image of the remaining virtual image. The reflector 22 is rigidly fastened to a shaft 24 preferably, though not necessarily, arranged in the front focal plane of the objective lens. An arm 25 is attached to the shaft 24 and is equipped at one end with a leaf spring 26 which carries a follower 27, adapted to engage cam 28. The cam 28 preferably is of circular configuration and is eccentrically mounted on the compensator shaft 29. A coil spring 30 of greater strength than the spring 26 keeps the follower in contact with the cam. The shafts 24 and 29 are supported by the wall 33 which forms a part of the apparatus.

A pair of stops 31 limit the extent of swinging movement of the arm 25. Upon engagement of the arm 25 with either stop, the spring 26 flexes to keep the follower 27 in contact with the cam. With this arrangement, the arm 25 is held in contact with a stop 31 during a portion of the revolution of the cam 28 and at such time the reflector is stationary. The cam is properly oriented on the shaft 29 so that the mirror is stationary during the time that light is transmitted to it and is moved between its two positions during the periods that light is intercepted by the obturators 14 and 15.

The degree of desired movement of the reflector depends on the focal length of the lens which under normal manufacturing conditions will vary between ±2%. To compensate for such variation the pins 31 are rigidly mounted on a plate 32 which is supported by a frame 33 for movement radially of the shaft 24. The plate 32 has a rack 34 which meshes with a pinion 35 mounted on a shaft 36 journalled in the frame 33. Rotation of the shaft 36 causes movement of the plate 32 to vary the extent of permissible movement of the arm 25.

During the first compensating stage, the full beam of light is reflected to the screen by the reflector in one position and during the second compensating stage the full beam of light is reflected to the screen by the reflector in its other positions. The two stationary positions of the reflector are so related that the real images are produced on the screen in registering relation.

I claim:

1. In a device of the character described, means for feeding motion picture film at uniform linear speed, rotatable plane-parallel refracting means arranged and adapted upon rotation in timed relation with the movement of the film to produce two successive stationary spaced virtual images of a luminous point on the moving film, means to rotate said refracting means in timed relation with the movement of said film, a lens for producing real images of said spaced virtual images, a pivoted reflector interceptive of light from said lens and rockable between two positions, and means actuated in timed relation with said refracting means for rocking said reflector between said positions and maintaining said reflector in each position for a predetermined period.

2. A motion picture apparatus comprising means for feeding film at uniform linear speed, movable optical compensating means, means to effect during movement of the film through a single picture cycle movement of the compensating means through two compensating cycles, whereby a point on the moving film is rendered optically conjugate successively with each of two stationary points lying in a common plane and being spaced in the direction of film travel, a lens for producing real images of said virtual images, a pivoted reflector interceptive of light from said lens and rockable between two positions, and means actuated in timed relation with said refracting means for rocking said reflector between two positions and maintaining said reflector in each position for a predetermined period.

3. In a device of the character described, means for feeding motion picture film at uniform linear speed, rotatable plane-parallel refracting means arranged and adapted upon rotation in timed relation with the movement of the film to produce two successive stationary spaced virtual images on a luminous point on the moving film, means to rotate said refracting means in timed relation with the movement of said film, a lens for producing real images of said spaced virtual images, a pivoted reflector interceptive of light from said lens and rockable between two positions, an arm carried by said reflector, a pair of stops engageable by said arm to limit extent of oscillation of said reflector, a resilient member extending from the end of said arm, and means actuated in timed relation with said compensating means for effecting to and fro movement of the end of said member alternately to engage said arm with said stops and to flex said resilient member.

4. A motion picture apparatus comprising means for feeding film at uniform linear speed, movable optical compensating means, means to effect during movement of the film through a single picture cycle movement of the compensating means through two compensating cycles, whereby a point on the moving film is rendered optically conjugate successively with each of two stationary points lying in a common plane and being spaced in the direction of film travel, a lens for producing real images of said virtual images, a pivoted reflector interceptive of light from said lens and rockable between two positions, an arm carried by said reflector, a pair of stops engageable by said arm to limit extent of oscillation of said reflector, a resilient member extending from the end of said arm, and means actuated in timed relation with said compensating means for effecting to and fro movement of the end of said member alternately to engage said arm with said stops and to flex said resilient member.

5. In a device of the character described, means for feeding motion picture film at uniform linear speed, rotatable plane-parallel refracting means arranged and adapted upon rotation in timed relation with the movement of the film to produce two successively stationary spaced virtual images of a luminous point on the moving film, means to rotate said refracting means in timed relation with the movement of said film, a lens for producing real images of said virtual images, a pivoted reflector interceptive of light from said lens and rockable between two positions, an arm carried by said reflector, a pair of stops engageable by said arm to limit extent of oscillation of said reflector, a resilient member extending from the end of said arm, an eccentrically mounted disk engaging the end of said resilient member, and means for rotating said disk in timed relation with said refracting means, for effecting to and fro movement of the end of said member alternately to engage said arms with said stops and to flex said resilient member.

6. A motion picture apparatus comprising means for feeding film at uniform linear speed, movable optical compensating means, means to effect during movement of the film through a single picture cycle movement of the compensating means through two compensating cycles, whereby a point on the moving film is rendered optically conjugate successively with each of two stationary points lying in a common plane and being spaced in the direction of film travel, a lens for producing real images of said virtual images, a pivoted reflector interceptive of light from said lens and rockable between two positions, an arm carried by said reflector, a pair of stops engageable by said arm to limit extent of oscillation of said reflector, a resilient member extending from the end of said arm, an eccentrically mounted disk engaging the end of said resilient member, and means for rotating said disk in timed relation with said refracting means for effecting to and fro movement of the end of said member alternately to engage said arms with said stops and to flex said resilient member.

JACOB F. LEVENTHAL.